April 26, 1938.  E. W. CLEARY  2,115,096
SURGICAL APPARATUS
Filed May 11, 1937  3 Sheets-Sheet 1
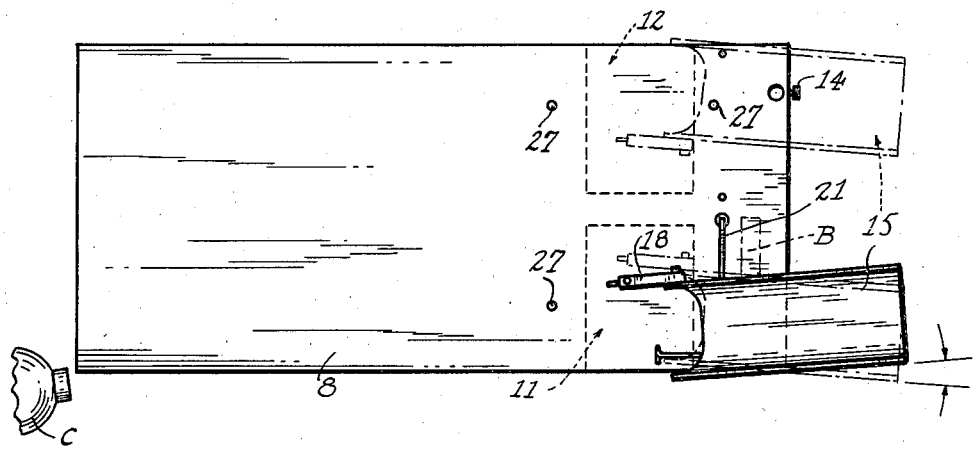
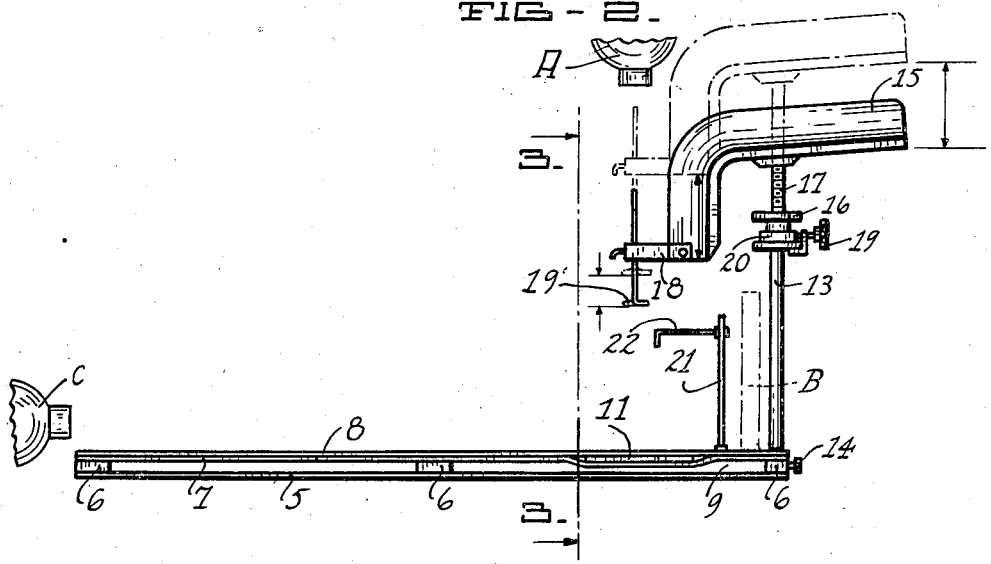
INVENTOR.
ERNEST W. CLEARY.
BY
ATTORNEY.

April 26, 1938.　　　E. W. CLEARY　　　2,115,096
SURGICAL APPARATUS
Filed May 11, 1937　　　3 Sheets-Sheet 2
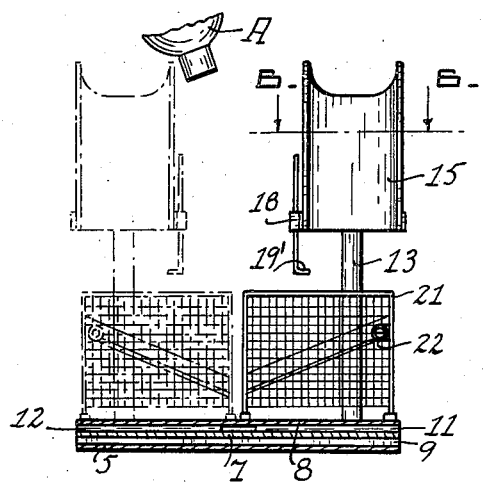
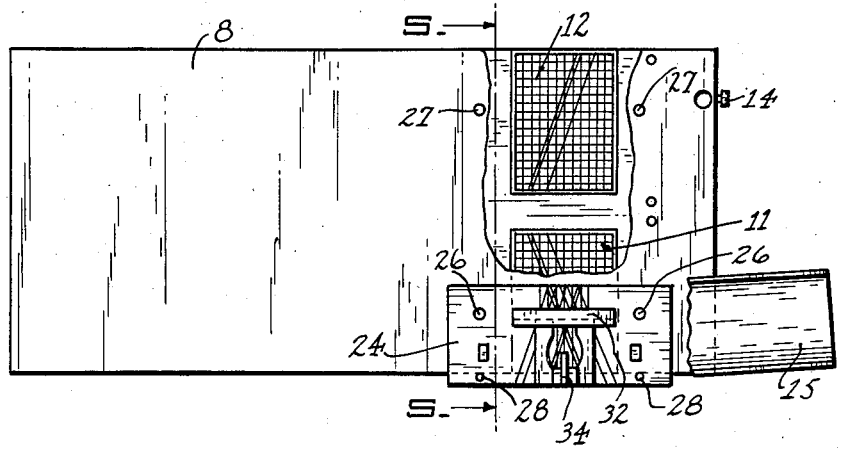
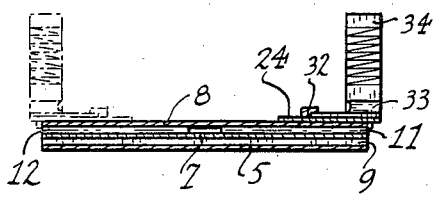
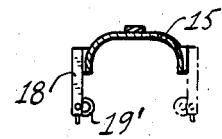
INVENTOR.
ERNEST W. CLEARY.
BY
ATTORNEY.

April 26, 1938. E. W. CLEARY 2,115,096
SURGICAL APPARATUS
Filed May 11, 1937 3 Sheets-Sheet 3
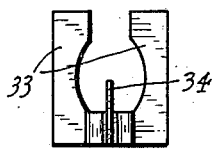
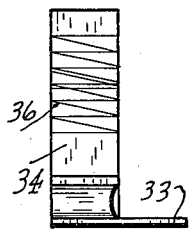
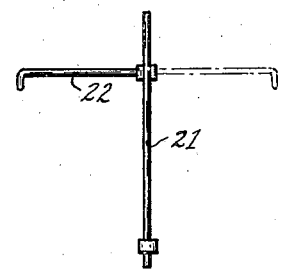
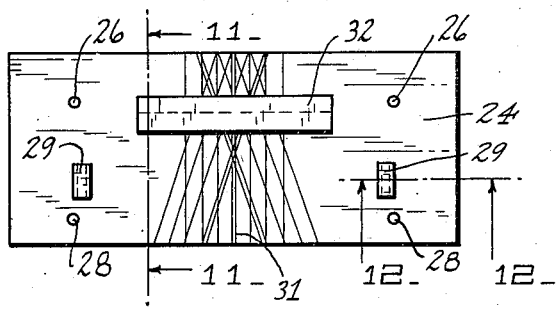
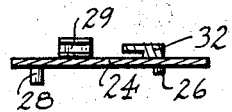
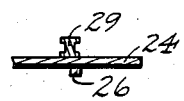
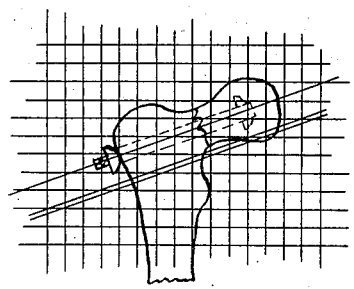
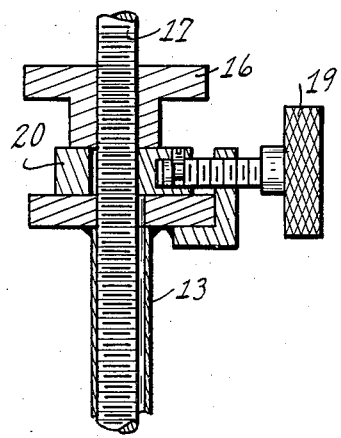
INVENTOR.
ERNEST W. CLEARY.
BY
ATTORNEY.

Patented Apr. 26, 1938

2,115,096

UNITED STATES PATENT OFFICE 2,115,096

SURGICAL APPARATUS

Ernest W. Cleary, San Francisco, Calif.

Application May 11, 1937, Serial No. 141,992

2 Claims. (Cl. 250—34)

This invention relates to improvements in surgical apparatus, and has particular reference to an accessory table to facilitate accurate fixation of a fractured femoral neck.

The principal object of this invention is to produce a device, whereby the bone of the injured person may be held in proper position after reduction and during the inserting of securing means in the fracture.

A further object of the invention is to provide means for definitely locating the point at which the fixation means is to be anchored within the broken bone.

A further object of the invention is to produce a device of this character wherein the operating field will be aseptic.

A further object of the invention is to produce a device of this character wherein the same may be used for either a right or left fracture.

A still further object of the invention is to produce a device of this character which may be readily transported and used with facility under adverse conditions.

Applicant has produced a device of this character which is economical to manufacture, simple to adjust and one which will greatly speed the operation by removing the guess work heretofore encountered.

Other objects and advantages will be apparent during the course of the following description.

In the accompanying drawings forming a part of this specification and in which like numerals are employed to designate like parts throughout the same, Fig. 1 is a top plan view of my table;

Fig. 2 is a side elevation of Fig. 1;

Fig. 3 is a cross sectional view taken on the line 3—3 of Fig. 2, and looking in the direction of the arrows;

Fig. 4 is a top plan view of the table with portions thereof broken away, and showing the aseptic localizing guide plates in position;

Fig. 5 is a cross sectional view taken on the line 5—5 of Fig. 4, and looking in the direction of the arrows;

Fig. 6 is a cross sectional view taken on the line 6—6 of Fig. 3;

Fig. 7 is a top plan view of the vertical aseptic guide plate;

Fig. 8 is a side elevation of Fig. 7;

Fig. 9 is an end elevation of the vertical grid and the locating ring;

Fig. 10 is a plan view of the horizontal guide plate;

Fig. 11 is a cross sectional view taken on the line 11—11 of Fig. 10;

Fig. 12 is a cross sectional view taken on the line 12—12 of Fig. 10;

Fig. 13 is an enlarged cross sectional view of the leg support clamp; and

Fig. 14 is a fragmentary view of the upper end of the femur, showing the nature of the ordinary break and the method of securing the parts together.

When a person fractures the femur neck, it is exceedingly difficult to hold the parts together without a positive method of fixation. Several methods have been devised, such as the Smith Peterson nail, Moore's multiple nails, or the Morrison lock bolt, and in order to apply these devices the doctor performing the operation must drill into the bone before the nails or pins may be inserted. As the bone is so deeply set in the muscles of the body, it is exceedingly difficult to locate with any degree of accuracy the point of entrance of the fixation member, or the direction in which this member must go, or the depth to which this member must go.

Applicant has, therefore, devised a table wherein immobilization of the fractured thigh is held in a position of right angled flexion, and with any desired degree of traction and rotation after reduction has been accomplished by any of the approved maneuvers. Thence by photographing through the medium of X-rays the definite location of this immobilized bone in relation to opaque grids also showing in the X-ray, and by employing these pictures in relation to guide plates, a positive location of the bone may be accomplished.

The operation of my device is as follows:—

Referring to Figs. 1 and 2, it will be noted that I provide an accessory table having a base 5 which may be placed upon any suitable support, such as an ordinary operating table. Spaced from this base by blocks 6 are top pieces 7 and 8. This construction forms a tunnel 9, the purpose of which will be later seen. Between the top pieces 7 and 8, I position grids 11 and 12 which are made of X-ray opaque material. It may be here noted that these grids 11 and 12 each have diagonally arranged wires, as best illustrated in Fig. 4, the purpose of which will be later seen. A leg support 15 is vertically and rotatably mounted upon a standard 13 secured to the table by a set screw 14. This standard 13 may be moved to either side of the table, as indicated in the full and dotted lines in Fig. 1. In order to elevate this leg support, I employ a threaded nut 16 engaging the screw thread 17, upon which the leg support is secured. A clamping member 20 controlled by a hand wheel 19 is employed for locking the screw 17 in any vertical position, and also against rotation upon its vertical axis. This leg support carries a bracket 18 which may be moved to either side of the support, as shown in Fig. 6. This bracket serves to adjustably support a sighting ring 19', the purpose of which will be later seen.

A vertical grid 21 carries a horizontal sighting ring 22 and diagonal wires similar to the diagonal wires shown in the grids 11 and 12. This guide ring may be moved to either side of the grid when the grid is reversed, as shown in Fig. 3, that is, moved from the full line position to the dotted line position. A localizing plate 24 is provided with pins 26 which are adapted to enter openings 27 formed in the table top 8. Also pins 28 contact the front edge of the table top and serve to guide the plate along the top laterally until the pins 26 enter the openings 27. Thumb pieces 29 are attached to the plate 24, and enable the operator to readily move the plate when desired. This plate carries a plurality of lines 31 and diagonals, which correspond to the diagonals and the lines formed by the grids 11 and 12 upon the X-ray picture, as will be later described. An undercut member 32 serves to position the base 33 of the vertical guide 34, which vertical guide has horizontal and diagonal lines 36 upon its sides which correspond to the horizontal lines of the vertical grid and the diagonals thereof, each shown on the X-ray picture.

In employing my device the patient is given an avertin basal anaesthetic and placed upon the operating table lying upon the back and upon the accessory table already placed upon the operating table. The injured joint is then injected with a solution of novocaine and the fracture reduced by any of the accepted methods. When the heel-palm test indicates reduction, the leg is then placed with the thigh at right angled flexion on the leg rest, and with sufficient traction applied to slightly lift the buttock from the table. The traction device is then locked through the medium of the wheel 19 with the hip in internal rotation, that is, with the long axis of the flexed lower leg forming an angle of about twenty degrees with the long axis of the torso.

In taking a picture showing the lateral view of the head, neck and trochanteric region the X-ray tube A is set above the pelvis and somewhat to the opposite side of the fractured hip. The sighting ring 19' permits the operator to direct the tube, so that the vertical shaft supporting the ring will cast a shadow across the center of the ring. This definitely locates the relation of the X-ray to the fracture, whereby all pictures taken with the apparatus so positioned will lie within definite areas. The film is placed within the tunnel 9 and a picture taken. When this film is developed, the shadow cast thereon by the focusing ring and the grid 11 or 12, as the case may be, will indicate upon this film the relative position of the tube at the moment of exposure, and the horizontal position of the head and neck of the femur upon the table top.

A second picture is now taken by placing an X-ray film in a vertical position between the grid 21 and the support 13, as indicated at B in dotted lines. The tube in this instance is placed slightly lateral to the patient's shoulder on the injured side and substantially level with the table top. This tube is shown at C. The set of the tube is focused by the horizontal locating ring 22. When the film is developed, the same will show the vertical position of the head and the neck of the femur with respect to the table top, which can be calculated through the correlation of the shadows of the vertical grid 21, and at the same time the diagonal wires will permit accurate location of the alignment of the fractured neck.

As soon as the X-rays have been developed and the relation between the fracture and the grid shadows determined, the sterilized plate 24 is slipped under the buttock completely covering that portion of the table which lies beneath the injured person. The pins 28 locating the plate and the pins 26 preventing the plate from sliding lengthwise of the table. By now placing the vertical guide, which has also been sterilized, with its base beneath the undercut 32, then the vertical guide may be moved horizontally to the right or left so that its vertical portion overlies the horizontal guide line corresponding to the position of the break upon the X-ray with relation to the grid shadows which correspond to the marks upon the plate 24. Now by employing the guide lines 36 on the guide plate 34, and by employing those lines which correspond to the position of the break on the vertical grid shadows cast upon the film, these two guiding factors thus determined will definitely locate the point at which the drill is to be inserted. A suitable sized drill is then employed, and by following these guide lines the drill is sure to enter through the trochanter, neck and head and in the direction and at the level indicated by the guides, after which a surgeon may insert any desired type of fixation element he prefers.

It will thus be seen that my device will accomplish all of the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a device of the character described, a body supporting surface having a grid support thereon, means for definitely positioning the limb of the body above said supporting surface and in fixed position with relation to the body and said grid, means for definitely directing X-rays through said body and said grid, means for positioning a photographic film to record the position of said limb and the bones thereof and said grid with relation to each other and to the direction of the X-rays, a vertical grid positioned on said supporting surface, sighting means carried by said vertical grid for aiding in directing X-rays horizontally with relation to said supporting surface, whereby the relation of said limb, and the bones thereof and said grid will be recorded on a photographic film by said additional X-rays, a sterile plate mounted on said supporting surface, markings carried by said plate to correspond with the shadows caused by said first mentioned grid on the resultant X-ray picture.

2. In a device of the character described, a body supporting surface having a fixed grid support thereon, means for definitely positioning the limb of the body above said supporting surface and said grid, means for definitely directing X-rays through said body and said grid, means for positioning a photographic film to record the position of said limb and the bones thereof and said grid with relation to each other and to the direction of the X-rays, a vertical grid positioned on said supporting surface, sighting means carried by said grid for aiding in directing X-rays horizontally with relation to said supporting surface, whereby the relation of said limb, and the bones thereof and said grid and said second mentioned directed X-rays may be photographically recorded, a sterile plate mounted on said supporting surface, markings carried by said plate to correspond with the shadows caused by said first mentioned grid on the resultant X-ray picture, and a vertical guide movable on said plate and having indicia lines thereon corresponding to the vertical grid as shown in the resultant lateral X-ray picture.

ERNEST W. CLEARY.